US009186765B2

(12) United States Patent
Ando et al.

(10) Patent No.: US 9,186,765 B2
(45) Date of Patent: Nov. 17, 2015

(54) MONITORING METHOD AND MONITORING APPARATUS FOR MACHINE TOOL, AND MACHINE TOOL

(75) Inventors: Tomoharu Ando, Niwa-Gun (JP); Hiroshi Ueno, Niwa-Gun (JP); Akihide Hamaguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 646 days.

(21) Appl. No.: 13/252,446

(22) Filed: Oct. 4, 2011

(65) Prior Publication Data
US 2012/0093598 A1    Apr. 19, 2012

(30) Foreign Application Priority Data
Oct. 15, 2010    (JP) .................................. 2010-232721

(51) Int. Cl.
*G01N 29/14*    (2006.01)
*B23Q 17/00*    (2006.01)
*B23Q 17/12*    (2006.01)

(52) U.S. Cl.
CPC .............. *B23Q 17/007* (2013.01); *B23Q 17/12* (2013.01); *G05B 2219/37435* (2013.01)
USPC .................................. 73/658; 73/587; 73/593

(58) Field of Classification Search
CPC .... B23Q 17/007; B23Q 17/12; Y10T 408/21; G05B 2219/37435
USPC ............ 73/658, 593, 659, 660, 587; 700/159, 700/160
See application file for complete search history.

(56) References Cited

U.S. PATENT DOCUMENTS

| 4,471,444 | A | * | 9/1984 | Yee et al. ...................... 700/175 |
| 4,559,600 | A | * | 12/1985 | Rao .............................. 700/175 |
| 4,644,335 | A | * | 2/1987 | Wen .............................. 340/683 |
| 4,802,095 | A | * | 1/1989 | Jeppsson ........................ 700/175 |
| 5,094,107 | A | * | 3/1992 | Schoch ............................ 73/570 |
| 5,663,894 | A | * | 9/1997 | Seth et al. ........................ 702/56 |
| 7,010,386 | B2 | * | 3/2006 | McDonnell et al. ........... 700/175 |
| 7,341,410 | B2 | * | 3/2008 | Hill et al. ....................... 409/234 |

(Continued)

FOREIGN PATENT DOCUMENTS

CN    101310921(A)    11/2008
JP    2009-274179 A1    11/2009

OTHER PUBLICATIONS

Yusuke Kurata, et al., "*Inverse Identification of a Transfer Function with Experimental Results in End Milling*," Nagoya University, Proceedings of 2008 Spring Meeting of the Japan Society for Precision Engineering, pp. 69-70.

(Continued)

*Primary Examiner* — J M Saint Surin
(74) *Attorney, Agent, or Firm* — Burr & Brown, PLLC (57) ABSTRACT

The monitoring apparatus includes vibration sensors that detect vibration accompanying machining, a rotation detector and a rotation detection section that detect rotation of a main spindle, and a stability limit and vibration distribution calculation section that creates, on the basis of vibration information obtained from the vibration sensors and a rotation speed of the main spindle detected by the rotation detector and rotation detection section, both a stability limit diagram illustrating a relationship between the rotation speed and a stability limit of the machining and a vibration distribution diagram illustrating a relationship between the rotation speed and the vibration, and displays the created diagrams on a monitor in a vertical arrangement.

12 Claims, 6 Drawing Sheets

(56) References Cited

U.S. PATENT DOCUMENTS

| | | | |
|---|---|---|---|
| 7,369,965 B2 * | 5/2008 | Mylaraswamy et al. | 702/185 |
| 2008/0105094 A1 * | 5/2008 | McMurtry et al. | 82/118 |
| 2008/0289923 A1 * | 11/2008 | Suzuki et al. | 188/379 |
| 2009/0319232 A1 * | 12/2009 | Griessler et al. | 702/184 |
| 2012/0095724 A1 * | 4/2012 | Ando et al. | 702/145 |

OTHER PUBLICATIONS

Chinese Office Action (and translation provided by foreign counsel) from a related Chinese patent application bearing a mailing date of Jan. 6, 2015, 14 pages.

* cited by examiner

| DATA No. | ITEM |
|---|---|
| DATA 1 | DATE<br>TIME<br>TOOL NUMBER<br>MAIN SPINDLE ROTATION SPEED [min$^{-1}$]<br>VIBRATION FREQUENCY [Hz]<br>VIBRATION |
| DATA 2 | DATE<br>TIME<br>TOOL NUMBER<br>MAIN SPINDLE ROTATION SPEED [min$^{-1}$]<br>VIBRATION FREQUENCY [Hz]<br>VIBRATION |
| ⋮ | ⋮ |

FIG. 6

MONITORING METHOD AND MONITORING APPARATUS FOR MACHINE TOOL, AND MACHINE TOOL

BACKGROUND OF THE INVENTION

This application claims the benefit of Japanese Patent Application Number 2010-232721 filed on Oct. 15, 2010, the entirety of which is incorporated by reference.

TECHNICAL FIELD

The present invention relates to a monitoring method and a monitoring apparatus for monitoring a machining state relating to vibration in a machine tool that performs machining while rotating a tool or a work piece mounted on a main spindle, and a machine tool including the monitoring apparatus.

BACKGROUND ART

In a machine tool such as a machining center that performs machining while rotating a tool or a work piece mounted on a main spindle, chatter vibration occurs conventionally in accordance with machining conditions such as a rotation speed and a feed speed of the main spindle. As a result, a machined surface deteriorates, and the tool is damaged such that a lifespan of the tool decreases.

When machining is performed for the first time, however, a machining condition such as the rotation speed must be found through trial and error based on experience. An operator records the machining condition during the trial and error process, and determines an optimum machining condition by rearranging the condition. Accordingly, chatter vibration is eliminated or reduced likewise through trial and error by modifying the rotation speed when the chatter vibration occurs.

A monitoring device that monitors a machining state of a machine tool relating to chatter vibration and indicates a machining condition under which the chatter vibration can be eliminated has been proposed. Japanese Patent Application Publication No. 2009-274179 (JP-A-2009-274179), for example, discloses an invention for drawing regions of natural vibration of a work piece before machining and after machining and a vibration component generated during passage of a flute of a tool on a Campbell chart (showing a frequency on the ordinate, a rotation speed on the abscissa, and a rotation order on a clinoaxis) so that a rotation speed at which the vibration component of the tool is absent can be recognized easily in the regions of natural vibration of the work piece before the machining and after the machining using the Campbell chart.

Meanwhile, "'Inverse identification of a transfer function with experimental results in end milling', Proceedings of 2008 Spring Meeting of The Japan Society for Precision Engineering Spring Meeting" discloses a method for determining a stability limit diagram through inverse identification of a transfer function from the frequency of chatter vibration measured during machining and a critical depth of cut. The stability limit diagram may also be determined using a method of measuring a transfer function of a machine structure in accordance with an impulse response method, but during actual machining, a transfer characteristic of the machine structure varies from moment to moment, and therefore, such stability limit diagram does not match the actual stability limit. When the aforesaid method is used, the stability limit diagram can be determined with a high degree of precision even in relation to a machine structure having a transfer characteristic that varies during rotation, and on the basis of the stability limit diagram, a rotation speed at which chatter vibration is avoided can be selected.

However, the present invention described in JP-A-2009-274179 is used to avoid forced chatter caused by a frequency input in accordance with a rotary frequency of the tool×a number of flutes×a positive integer, and is not capable of dealing with regenerative chatter.

Further, a Campbell chart typically expresses an amplitude of the vibration as a magnitude of a circle and expresses a chatter frequency and a magnitude of the vibration at an arbitrary rotation speed, but in JP-A-2009-274179, this type of actual vibration information is not used. For example, when the tool becomes worn, an impulse-like force may be exerted on the work piece from the tool, and as a result, chatter may occur at a natural frequency of the work piece at all rotation speeds. Hence, actual measurement values of the machining must also be displayed on the Campbell chart in order to determine a chatter condition, and therefore, when the rotation speed is checked, a correlation between the rotation speed and the magnitude of the vibration and so on cannot easily be understood.

Meanwhile, the method of "'Inverse identification of a transfer function with experimental results in end milling', Proceedings of 2008 Spring Meeting of The Japan Society for Precision Engineering", although effective in relation to regenerative chatter, assumes that chatter occurs in an end milling tool in a perfectly identical mode, and therefore, with this method, the stability limit of regenerative chatter cannot always be calculated with a high degree of precision under all machining conditions. However, an operator who has little knowledge of chatter cannot determine the actual machining conditions under which the stability limit diagrams are unlikely to match the stability limit of regenerative chatter, simply by looking at the stability limit diagrams.

SUMMARY OF THE INVENTION

It is therefore an object of the present invention to provide a monitoring method and a monitoring apparatus for a machine tool with which a machining state relating to vibration can be grasped quickly and easily and an optimum machining condition can be derived efficiently, and a machine tool.

To achieve the object described above, according to a first aspect of the present invention, a monitoring method for a machine tool includes the steps of detecting vibration accompanying machining, detecting a rotation speed of a main spindle, creating a stability limit diagram illustrating a relationship between the rotation speed and a stability limit of the machining on the basis of vibration information obtained in the vibration detection step and the rotation speed detected in the rotation detection step, and displaying the created stability limit diagram on a display unit, and displaying a current rotation speed on the stability limit diagram in the form of a straight line that is orthogonal to a rotation speed axis.

According to a second aspect of the present invention, in the configuration according to the first aspect, in the diagram drawing and displaying step, a vibration distribution diagram illustrating a relationship between the rotation speed and the vibration is created in addition to the stability limit diagram such that a range and a length of the rotation speed axis of the stability limit diagram are identical to those of the rotation speed axis of the vibration distribution diagram, and in the current speed display step, the straight line is displayed so as to straddle the stability limit diagram and the vibration distribution diagram.

According to a third aspect of the present invention, in the configuration according to the first or second aspect, the method further includes the step of recording the created diagrams together with information relating to the used tool.

To achieve the object described above, according to a fourth aspect of the present invention, a monitoring apparatus for a machine tool includes a vibration detection unit that detects vibration accompanying machining, a rotation detection unit that detects a rotation speed of a main spindle, a diagram drawing and displaying unit that creates a stability limit diagram illustrating a relationship between the rotation speed and a stability limit of the machining on the basis of vibration information obtained by the vibration detection unit and the rotation speed detected by the rotation detection unit, and displays the created stability limit diagram on a display section, and a current speed display unit that displays a current rotation speed on the stability limit diagram in the form of a straight line that is orthogonal to a rotation speed axis.

According to a fifth aspect of the present invention, in the configuration according to the fourth aspect, the diagram drawing and displaying unit creates a vibration distribution diagram illustrating a relationship between the rotation speed and the vibration in addition to the stability limit diagram such that a range and a length of the rotation speed axis of the stability limit diagram are identical to those of the rotation speed axis of the vibration distribution diagram, and the current speed display unit displays the straight line so as to straddle the stability limit diagram and the vibration distribution diagram.

According to a sixth aspect of the present invention, in the configuration according to the fourth or fifth aspect, the apparatus further includes a recording unit that records the created diagrams together with information relating to the used tool.

To achieve the object described above, according to a seventh aspect of the presents invention, a machine tool that performs machining by rotating a tool or a work piece mounted on a main spindle includes the monitoring apparatus according to any one of the fourth to the sixth aspects.

According to the first, the fourth and the seventh aspects of the present invention, a current machining state can be visually checked easily and reliably, and as a result, an optimum rotation speed can be indicated easily.

According to the second and the fifth aspects of the present invention, in addition to the effects described above, the stability limit diagram determined from the actual machining and the vibration distribution diagram for each speed are displayed at the same time as the current rotation speed, and therefore the current machining state relating to vibration can be grasped quickly and easily. As a result, an optimum machining condition can be derived efficiently.

According to the third and sixth aspects of the present invention, in addition to the effects described above, information relating to the used tool is recorded together with the created diagrams, and therefore the diagrams can be searched by the tool information and referenced easily when machining is performed subsequently on a different work piece using an identical tool.

DETAILED DESCRIPTION OF THE EMBODIMENTS

An embodiment of the present invention will be described below on the basis of the drawings.

Figure 1:
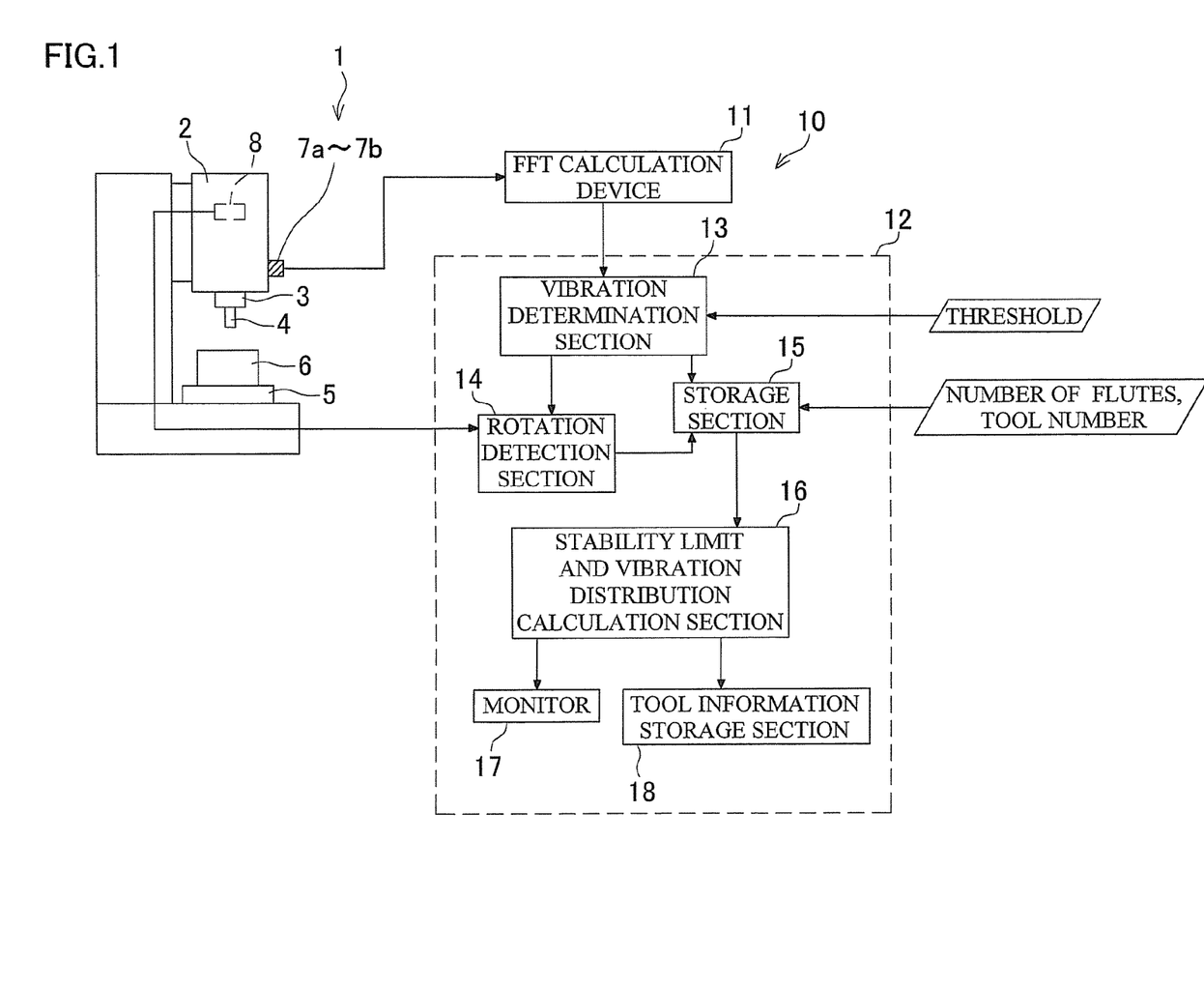
FIG. 1 is a schematic diagram showing a configuration of a vertical machining center.

FIG. 1 is a schematic diagram showing a configuration of a vertical machining center serving as an example of a machine tool. A vertical machining center 1 has a conventional configuration wherein a main spindle 3 is provided on a spindle head 2, which is disposed in an upper portion, to be free to rotate about a C axis, and a work piece 6 set on a machining table 5 disposed in a lower portion is machined by a tool 4 mounted on the main spindle 3. In the vertical machining center 1, a numerical value control device 12 provided in a monitoring apparatus 10, to be described below, controls rotation of the main spindle 3 in accordance with an NC program, and the tool 4 can be exchanged automatically using an automatic tool exchanging device, not shown in the drawings.

Figure 2:
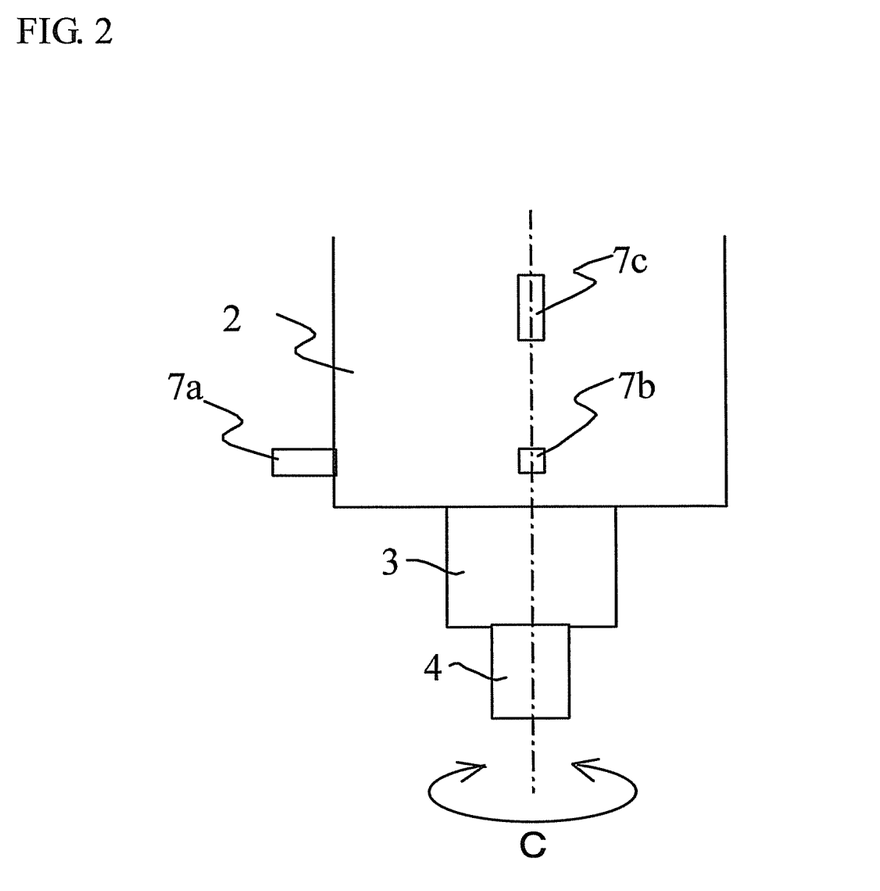
FIG. 2 is a side view of a main spindle housing.
Figure 3:
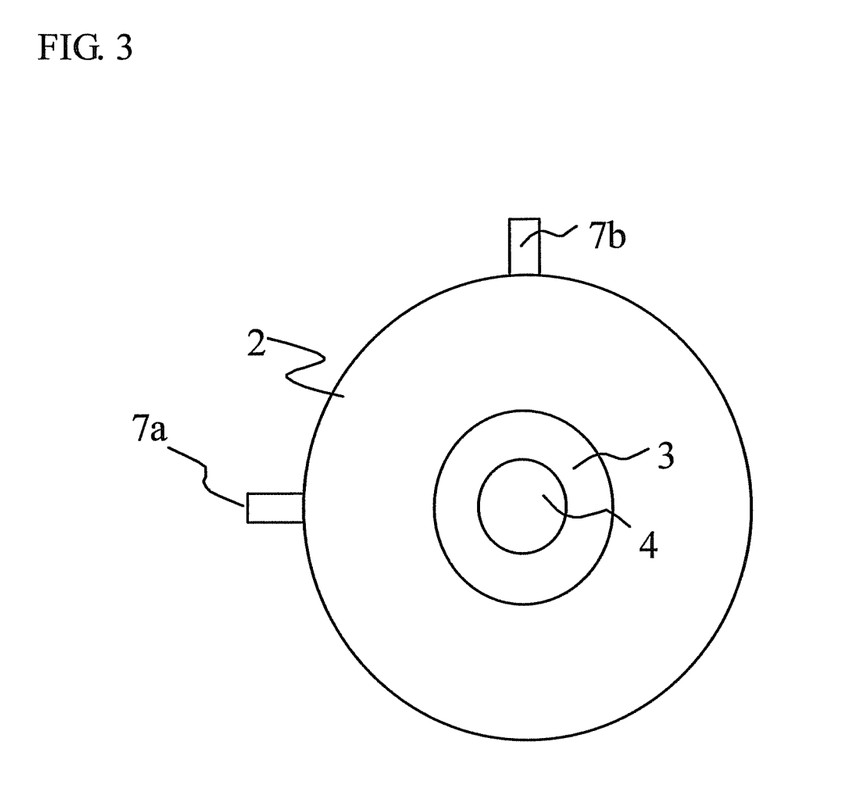
FIG. 3 is a front view (a view seen from an axial direction) of the main spindle housing.

The monitoring apparatus 10 is provided with an FFT calculation device 11 and the numerical value control device 12. Vibration sensors 7a to 7c serving as a vibration detection unit for measuring vibration are provided on the spindle head 2 and connected to the FFT calculation device 11. The vibration sensors 7a to 7c detect a time-domain vibration (vibration on a temporal axis) occurring as the main spindle 3 rotates, and as shown in FIGS. 2 and 3, are mounted on the spindle head 2 to be capable of detecting time-domain vibration information in mutually orthogonal X axis, Y axis, and Z axis directions. The FFT calculation device 11 performs Fourier analysis on the basis of the vibration detected by the vibration sensors 7a to 7c.

Further, the numerical value control device 12 includes a vibration determination section 13 that determines whether or not chatter vibration is occurring on the basis of a threshold input by an operator, and a rotation detection section 14 that detects a rotation speed of the main spindle 3 from an output of a rotation detector 8 provided on the spindle head 2. The rotation detector 8 and the rotation detection section 14 constitute a rotation detection unit.

The vibration determination section 13 compares a vibration converted into a frequency domain by the FFT calculation device 11 with a threshold, and when the vibration exceeds the threshold, the vibration determination section 13 transmits the vibration and the frequency thereof to a storage section 15 and issues an instruction to transmit the rotation speed of the main spindle 3 detected by the rotation detection section 14 to the storage section 15. The vibration information including the vibration, the frequency, and the rotation speed transmitted to the storage section 15 is recorded in association with a number of flutes and a tool number, which are input by the operator.

Reference numeral 16 denotes a stability limit and vibration distribution calculation section serving as a diagram drawing and displaying unit. Here, the stability limit and vibration distribution calculation section 16 calculates a stability limit using the vibration information recorded in the storage section 15 and arranges vibration distributions at respective speeds. The stability limit and vibration distribution calculation section 16 then creates a stability limit diagram and a vibration distribution diagram, displays the two diagrams on a monitor 17 provided as standard in the numerical value control device 12 as a display section for displaying the NC program, a current machine position, and so on, and records the obtained stability limit diagram and vibration distribution diagram in a tool infatuation storage section 18 serving as a storage unit in relation to each tool number.

Figure 4:
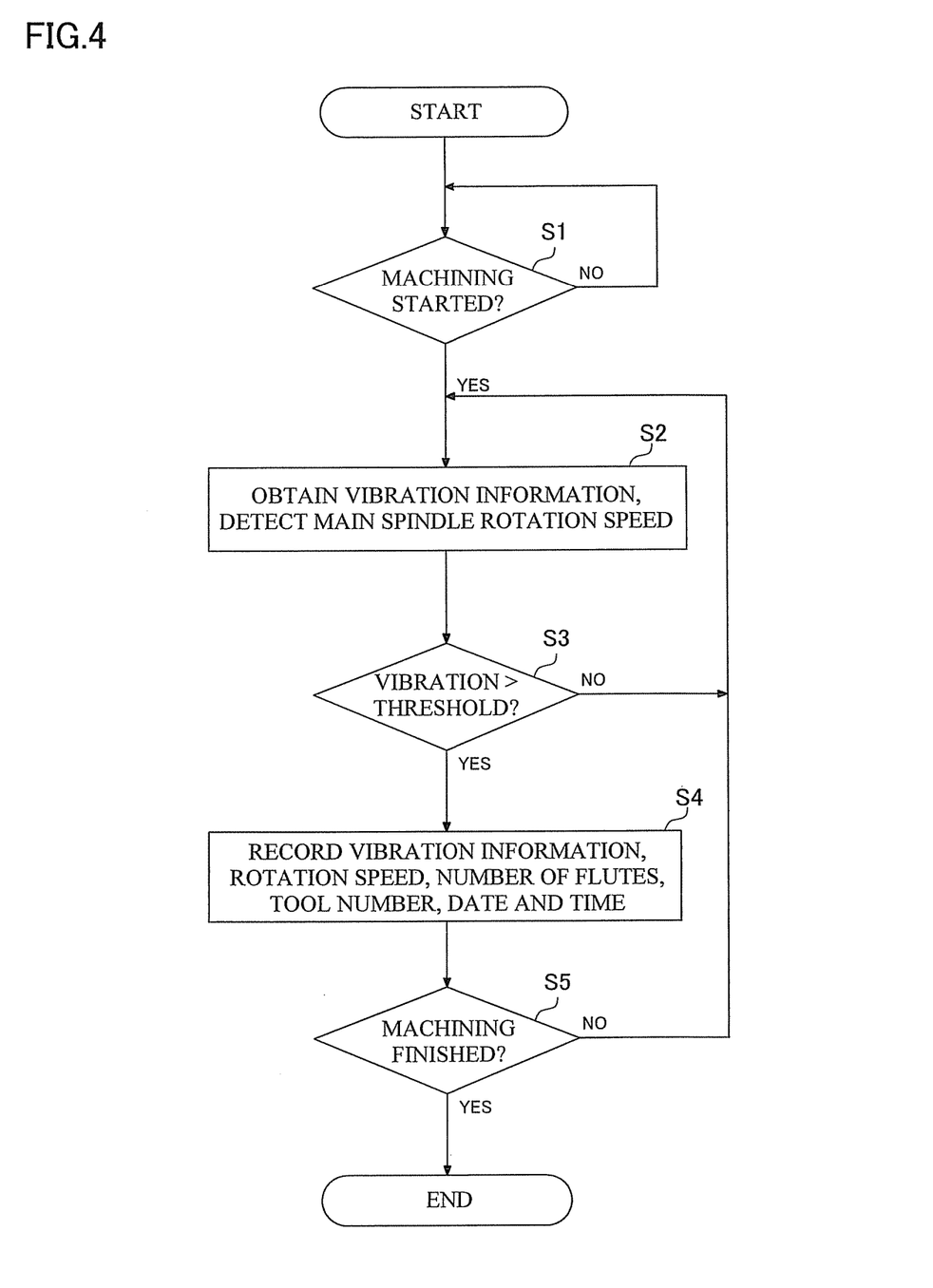
FIG. 4 is a flowchart of a monitoring method.

A monitoring method executed by the monitoring apparatus 10 of the vertical machining center 1 having the above configuration in order to monitor a machining state relating to vibration will now be described on the basis of a flowchart shown in FIG. 4.

First, when machining begins at S1, the numerical value control device 12 obtains current vibration information from the vibration sensors 7a to 7c via the FFT calculation device 11 in S2 (vibration detection step), whereupon the rotation detection section 14 detects the rotation speed of the main spindle 3 from the rotation detector 8 (rotation detection step). In S3, the vibration determination section 13 compares the time-domain vibration with a threshold set in advance by the operator. When it is determined that the detected vibration is equal to or smaller than the threshold, the routine returns to S2, where acquisition of the vibration information is continued. When the detected vibration is larger than the threshold, on the other hand, the vibration information, the rotation speed, the number of flutes, the tool number, and the date and time are recorded in the storage section 15 in S4. When the machining is determined not to be finished in S5, the processing from S2 onward is continued.

Figure 5:
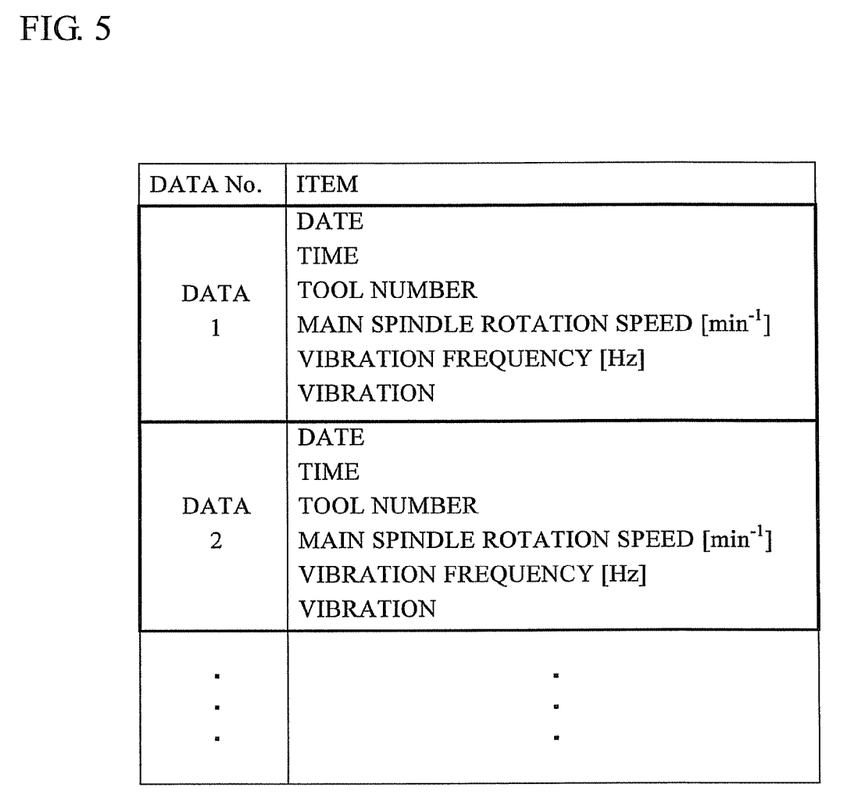
FIG. 5 is an illustrative view showing an example of vibration information.

As a result, data 1, data 2, . . . are obtained as shown in FIG. 5. Each data set 1, 2, . . . is constituted by the date, the time, the tool number, the rotation speed, a vibration frequency, and the vibration.

Figure 6:
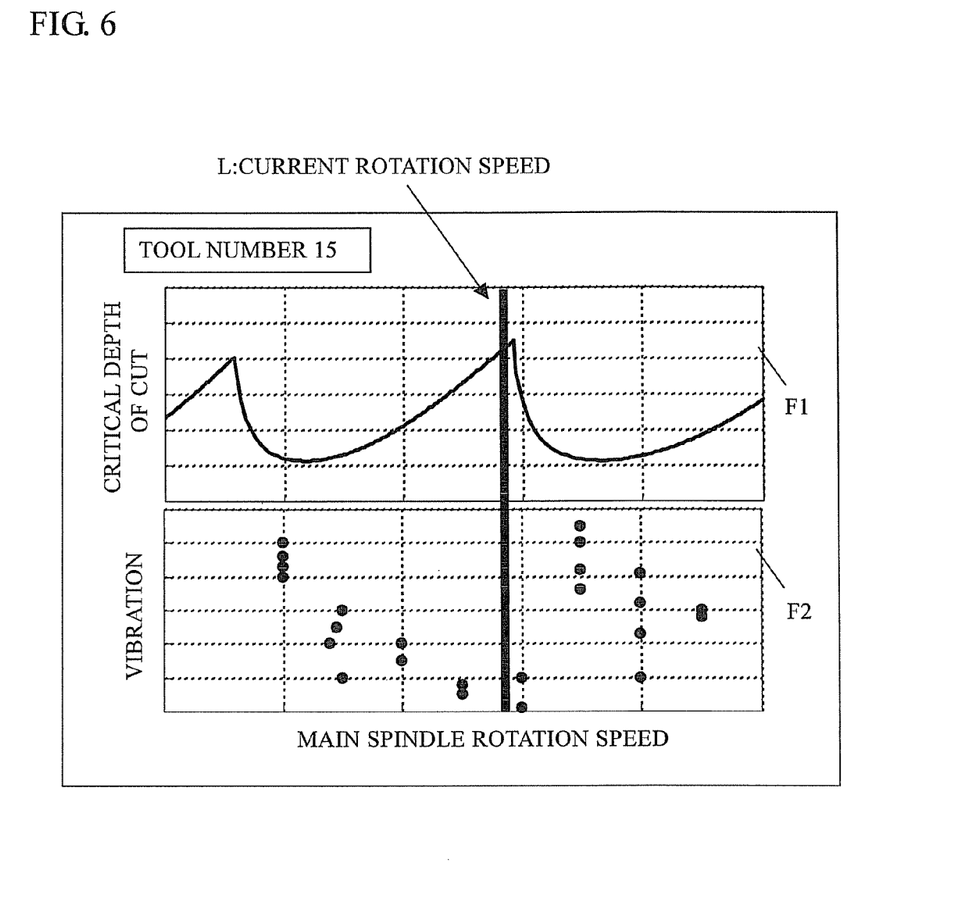
FIG. 6 is an illustrative view showing display of a stability limit diagram and a vibration distribution diagram on a monitor.

When a command is subsequently input by the operator to display the stability limit diagram and the vibration distribution diagram, the stability limit and vibration distribution calculation section 16 calculates the stability limit using the data 1, data 2, . . . recorded as shown in FIG. 5, creates a stability limit diagram F1 and a vibration distribution diagram F2 as shown in FIG. 6, i.e. so that the stability limit diagram F1 is positioned on the top, the vibration distribution diagram F2 is positioned on the bottom, and a range and a length of the main spindle rotation speed serving as the abscissa in the stability limit diagram F1 are set to be identical to those in the vibration distribution diagram F2, and displays the diagrams on the monitor 17 (diagram drawing and displaying step). Furthermore, here, the stability limit and vibration distribution calculation section 16, which also serves as a current speed display unit, displays the current main spindle rotation speed as a straight line L straddling the stability limit diagram F1 and the vibration distribution diagram F2 orthogonal to the rotation speed axis (current speed displaying step). The straight line L indicating the current rotation speed moves in a left-right direction in response to variation in the speed of the main spindle 3. The number of the tool used in the machining is displayed in an upper left corner of the monitor 17. The stability limit diagram F1 and vibration distribution diagram F2 may be recorded in the tool information storage section 18 in response to a command input by the operator.

Thus, the operator can check the reliability of the stability limit diagram easily. More specifically, when the stability limit diagram is determined to be reliable, the operator can use the stability limit diagram, and when the reliability is determined to be low, the operator can use the vibration distribution diagram. In both cases, an optimum rotation speed can be selected, and therefore an optimum machining condition can be found efficiently. Hence, even in the case of forced chatter, when the stability limit diagram cannot be used, a rotation speed at which vibration is small can be set as the machining condition using the vibration distribution diagram.

In particular, the current rotation speed is displayed at the same time on the stability limit diagram and the vibration distribution diagram, and therefore, even when a numerical value of the rotation speed in a stable range is not read, the rotation speed can be modified to the stable range easily by aligning a stable region shown on the diagrams with the straight line of the current speed while modifying overriding of the main spindle speed instead of modifying the program, for example. In so doing, it is possible to shift to the optimum rotation speed quickly and easily.

Hence, the monitoring apparatus 10 for the vertical machining center 1 according to the embodiment described above includes the vibration sensors 7a to 7c that detect vibration accompanying the machining, the rotation detector 8 and rotation detection section 14 that detect rotation of the main spindle 3, the diagram drawing and displaying unit (the stability limit and vibration distribution calculation section 16) that creates the stability limit diagram illustrating the relationship between the rotation speed and the stability limit of the machining on the basis of the vibration information obtained from the vibration sensors 7a to 7c and the rotation speed of the main spindle 3 detected by the rotation detector 8 and the rotation detection section 14 and displays the created stability limit diagram on the monitor 17, and the current speed display unit (the stability limit and vibration distribution calculation section 16) that displays the current rotation speed on the stability limit diagram in the form of the straight line L that is orthogonal to the rotation speed axis. With the monitoring apparatus 10, the current machining state can be visually checked easily and reliably by executing the monitoring method constituted by the respective steps described above, and as a result, an optimum rotation speed can be indicated easily.

In this case in particular, the stability limit and vibration distribution calculation section 16 creates the vibration distribution diagram illustrating the relationship between the rotation speed and the vibration in addition to the stability limit diagram, sets the range and length of the rotation speed axis to be identical on both the stability limit diagram and the vibration distribution diagram, and displays the straight line L so as to straddle the stability limit diagram and the vibration distribution diagram. Therefore, the current machining state relating to vibration can be grasped quickly and easily, and as a result, an optimum machining condition can be derived efficiently.

By further providing the recording unit (the tool information storage section 18) for recording the created diagrams together with the information relating to the used tool, the diagrams can be searched by the tool information and referenced when machining is performed subsequently on a different work piece using an identical tool.

Note that in the above embodiment, the current rotation speed is displayed on the monitor in the form of a straight line that is orthogonal to the rotation speed axis and straddles the stability limit diagram and the vibration distribution diagram. However, the current rotation speed may be displayed in the form of separate straight lines on the respective diagrams, and a numerical value display may be added to the straight line. Furthermore, the specific layout of the diagrams may be modified appropriately by inverting the vertical arrangement of the two diagrams, arranging the two diagrams in the left-right direction such that the rotation speed axis is set on the ordinate and the critical depth of cut and vibration are set on the abscissa, and so on.

Further, in the example described above, the operator selects and modifies the rotation speed on the basis of the displayed stability limit diagram and vibration distribution diagram. However, the present invention may be implemented in a machine tool installed with a numerical value control device capable of automatically modifying the rotation speed of the main spindle such that the rotation speed of the main spindle is modified to a stable rotation speed automatically on the basis of a calculated value of the stability limit.

Moreover, in the above embodiment, the stability limit diagram and the vibration distribution diagram are displayed at an arbitrary timing after calculating the stability limit using the recorded vibration information. However, the calculation may be performed every time the vibration information is extracted such that the stability limit diagram and vibration distribution diagram are displayed on the monitor constantly in real time.

Furthermore, the stability limit and vibration distribution calculation section doubles as a diagram drawing and displaying unit and a current speed display unit, but the diagram drawing and displaying unit and the current speed display unit may be provided separately.

In the above embodiment, the stability limit diagram and the vibration distribution diagram are created and displayed side by side on the monitor, but the stability limit diagram may be created alone and displayed together with the straight line orthogonal to the rotation speed axis. In this case also, the current machining state can be visually checked easily and reliably such that an optimum rotation speed can be indicated easily.

Meanwhile, the vibration may be detected using a microphone, a position/rotation detector, or a current of a main spindle/feed spindle motor as the vibration detection unit instead of the vibration sensors.

Further, in the above embodiment, the monitoring apparatus is constructed using a numerical value control device for a machine tool, but the vibration information may be transmitted to a computer provided on the exterior of the machine tool and having an input unit and a monitor via a network connected to a numerical value control device such that the stability limit diagram and vibration distribution diagram are created on the external computer and displayed together with the current rotation speed. In so doing, a plurality of machine tools can be managed in a concentrated fashion from a single location.

Furthermore, the machine tool is not limited to a vertical machining center, and the present invention may be applied to another machine tool, such as an NC lathe, that performs machining by rotating a work piece mounted on a main spindle.

What is claimed is:

1. A monitoring method for monitoring a machining state relating to vibration in a machine tool that performs machining by rotating a tool or a work piece mounted on a main spindle, the monitoring method comprising the steps of:
    detecting vibration accompanying the machining;
    detecting a rotation speed of the main spindle;
    creating a stability limit diagram illustrating a relationship between the rotation speed and a stability limit of the machining on the basis of vibration information obtained in the vibration detection step and the rotation speed detected in the rotation detection step, and displaying the created stability limit diagram on a display unit; and
    displaying a current rotation speed on the stability limit diagram in the form of a straight line that is orthogonal to a rotation speed axis.

2. The monitoring method for a machine tool according to claim 1, wherein, in the diagram drawing and displaying step, a vibration distribution diagram illustrating a relationship between the rotation speed and the vibration is created in addition to the stability limit diagram such that a range and a length of the rotation speed axis of the stability limit diagram are identical to those of the rotation speed axis of the vibration distribution diagram, and
    in the current speed display step, the straight line is displayed so as to straddle the stability limit diagram and the vibration distribution diagram.

3. The monitoring method for a machine tool according to claim 2, further comprising the step of recording the created diagrams together with information relating to the used tool.

4. The monitoring method for a machine tool according to claim 1, further comprising the step of recording the created diagrams together with information relating to the used tool.

5. A monitoring apparatus for a machine tool that includes a display section and monitors a machining state relating to vibration in a machine tool that performs machining by rotating a tool or a work piece mounted on a main spindle, the monitoring apparatus comprising:
    a vibration detection unit that detects vibration accompanying the machining;
    a rotation detection unit that detects a rotation speed of the main spindle;
    a diagram drawing and displaying unit that creates a stability limit diagram illustrating a relationship between the rotation speed and a stability limit of the machining on the basis of vibration information obtained by the vibration detection unit and the rotation speed detected by the rotation detection unit, and displays the created stability limit diagram on the display section; and
    a current speed display unit that displays a current rotation speed on the stability limit diagram in the form of a straight line that is orthogonal to a rotation speed axis.

6. The monitoring apparatus for a machine tool according to claim 5, wherein the diagram drawing and displaying unit creates a vibration distribution diagram illustrating a relationship between the rotation speed and the vibration in addition to the stability limit diagram such that a range and a length of the rotation speed axis of the stability limit diagram are identical to those of the rotation speed axis of the vibration distribution diagram, and
    the current speed display unit displays the straight line so as to straddle the stability limit diagram and the vibration distribution diagram.

7. The monitoring apparatus for a machine tool according to claim 6, further comprising a recording unit that records the created diagrams together with information relating to the used tool.

8. A machine tool that performs machining by rotating a tool or a work piece mounted on a main spindle, comprising the monitoring apparatus according to claim 6.

9. A machine tool that performs machining by rotating a tool or a work piece mounted on a main spindle, comprising the monitoring apparatus according to claim 7.

10. The monitoring apparatus for a machine tool according to claim 5, further comprising a recording unit that records the created diagrams together with information relating to the used tool.

11. A machine tool that performs machining by rotating a tool or a work piece mounted on a main spindle, comprising the monitoring apparatus according to claim 10.

12. A machine tool that performs machining by rotating a tool or a work piece mounted on a main spindle, comprising the monitoring apparatus according to claim 5.

* * * * *